Nov. 25, 1924.

L. B. PAUL

RIM

Original Filed Jan. 24, 1922   2 Sheets-Sheet 1

1,516,643

L. B. Paul INVENTOR

BY Victor J. Evans ATTORNEY

WITNESSES

Nov. 25, 1924.
L. B. PAUL
RIM
1,516,643
Original Filed Jan. 24, 1922   2 Sheets-Sheet 2
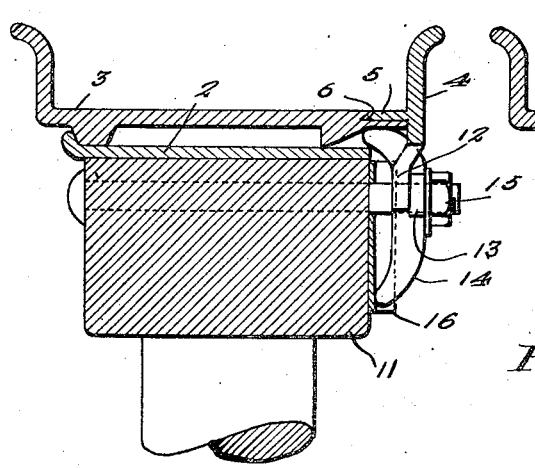
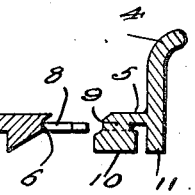
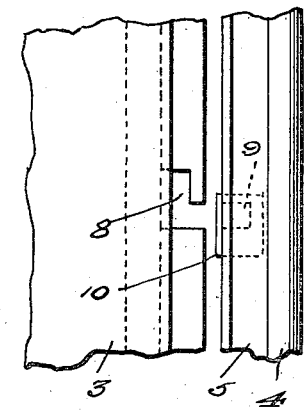
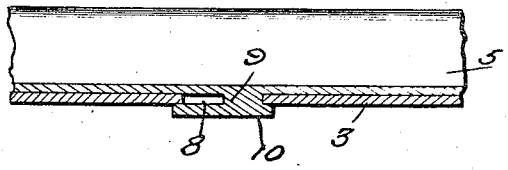
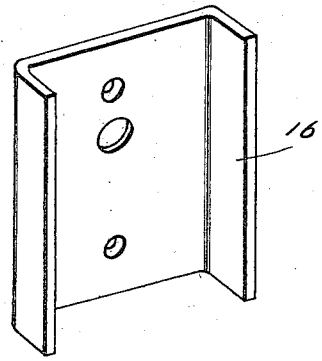
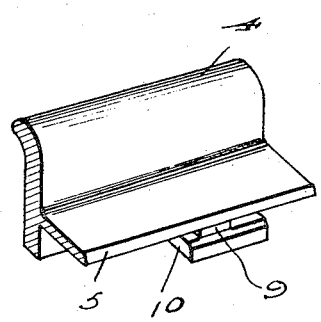
L. B. Paul INVENTOR
BY Victor J. Evans ATTORNEY
WITNESSES Patented Nov. 25, 1924.

1,516,643

UNITED STATES PATENT OFFICE.

LEONARD B. PAUL, OF OMAHA, NEBRASKA.

RIM.

Application filed January 24, 1922, Serial No. 531,444. Renewed April 15, 1924.

*To all whom it may concern:*

Be it known that I, LEONARD B. PAUL, a citizen of the United States, residing at Omaha, in the county of Douglas and State of Nebraska, have invented new and useful Improvements in Rims, of which the following is a specification.

This invention relates to a tire rim, the general object of the invention being to provide a combined detachable ring and a demountable rim so that the tire can be easily and quickly placed upon the rim by removing the ring and the rim with the tire thereon can be removed from the wheel and the spare tire and rim substituted therefor.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 2 is a cross sectional view through the felly part of the wheel and showing the tire removed.

Figure 3 is a cross sectional view through the rim and the ring showing the ring detached.

Figure 4 is a fragmentary plan view of Figure 3.

Figure 5 is a fragmentary longitudinal sectional view taken through the ring and rim.

Figure 8 is a perspective view of one of the lug holding members.

Figure 9 is a perspective view of a portion of the ring.

Figure 1:
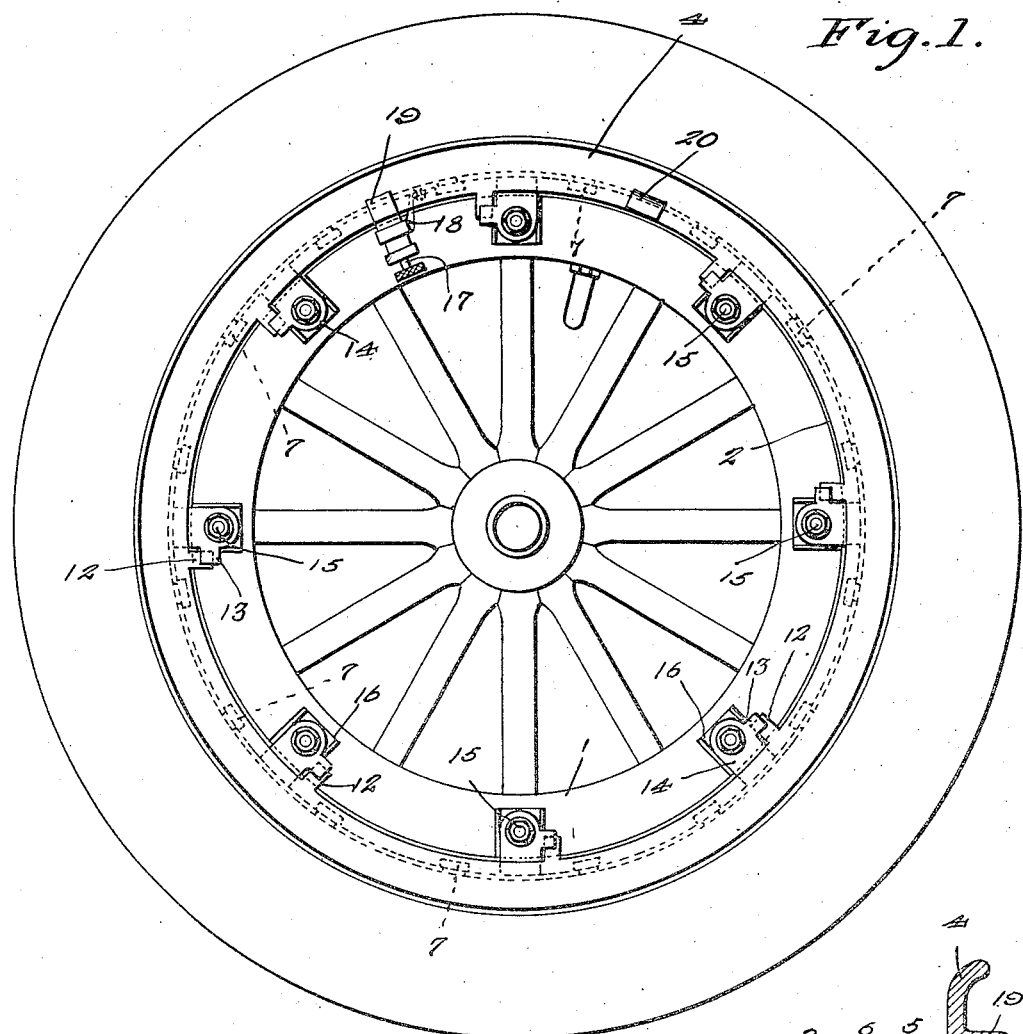
Figure 1 is an elevation of a wheel provided with my invention.
Figure 7:
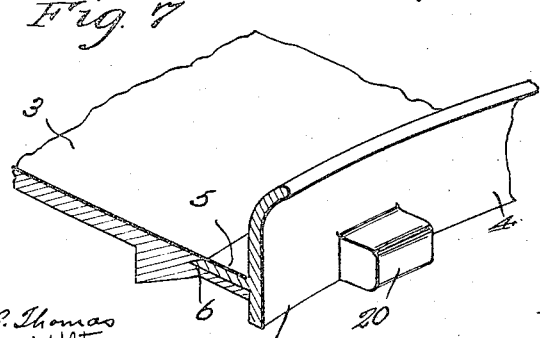
Figure 7 is a fragmentary perspective view showing the lug 20.
Figure 6:
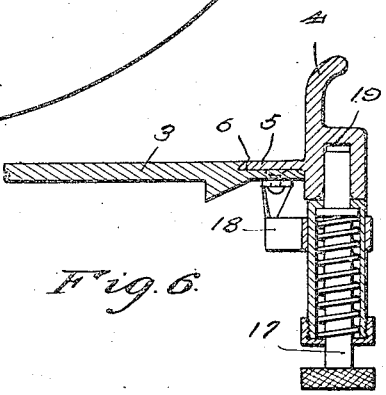
Figure 6 is a detail sectional view taken through the locking device 17.

In these views 1 indicates the felly of the wheel which is provided with the rim 2 which has its inner edge turned up and its outer edge flat, as usual, so as to receive the tire rim 3. 4 indicates the ring for holding the tire on the rim, this ring being provided with the flange 5 which engages an annular recess 6 in the outer part of the rim. The ring is detachably connected with the rim by the bayonet joints 7, each of which consists of the angle slot 8 in the rim and a stud 9 on the flange of the ring. Each stud is provided with a head 10 which acts to close the slot when the parts are in operative position to prevent mud and dirt from entering the slot. The ring is also provided with an inwardly extending part 11 which acts to close the space between the felly and rim to prevent dirt and the like from entering this space. The ring is also provided with inwardly extending projections 12 which engage side proections 13 on the lug plates 14 which hold the rim on the wheel and which are held in position by the usual bolts and nuts 15. Each lug is supported in a channel member 16 which is secured to the felly and which is provided with an opening through which the bolt passes. This member prevents turning movement of the lug plate.

In order to prevent turning movement of the ring on the rim I provide a spring pressed locking pin 17 which is adjustably secured to the bottom of the rim by the pivoted bracket 18 so that it may be swung under the rim or to a position where the pin will be projected by its spring into a socket 19, formed in the ring. In this projected position the pin will prevent turning movement of the ring. In order to facilitate turning of the ring when the pin has been retracted I provide a projection 20 thereon which is adapted to be struck by a hammer or the like in order to turn the ring to move the lugs 9 out of the holding portions of the slots 8 and also to move the projections 12 away from the projections 13 on the lug plates.

From the above it will be seen that when a tire is to be removed from the rim it is simply necessary to retract the pin 17 and to swing it inwardly to hold it in retracted position so that it will not interfere with the removal or replacing of the tire. The projection 20 is then struck by a hammer or the like to turn it so as to move the projections 12 away from the projections 13 and the lugs 9 out of the holding parts of the slots 8. The ring can be removed from the rim in order to permit the tire to be removed. After the tire has been replaced the ring is turned in an opposite direction to place the lugs in locking engagement and then the pin is placed in engagement with the socket to lock the ring against turning movement. If it is desired to remove the entire rim the lug plates are removed and then the rim with the ring thereon can be removed from the wheel. Thus the device can be used to support a spare tire.

The flanges of the rim and ring can be made of any desired shape to fit the different kinds of tires.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A rim of the class described comprising a rim section and a ring section, means for locking the sections together by a partial turning movement of the ring section and means for locking the ring section against turning movement, such means consisting of a bracket pivotally secured to the rim section, a spring pressed pin carried by said bracket and a socket in the ring section for receiving said pin.

In testimony whereof I affix my signature.

LEONARD B. PAUL.